United States Patent [19]

Cicatelli

[11] 4,067,488
[45] Jan. 10, 1978

[54] PACKAGE BUSHING-FLY WHEEL-CAPSTAN FOR PLAYBACK AND/OR RECORDING APPARATUS

[75] Inventor: Rodolfo Cicatelli, Gandria-Lugano, Switzerland

[73] Assignee: Autovox S.p.A., Rome, Italy

[21] Appl. No.: 711,214

[22] Filed: Aug. 3, 1976

[30] Foreign Application Priority Data

Aug. 5, 1975 Italy ................................. 50837/75

[51] Int. Cl.² ........................................... B65H 17/20
[52] U.S. Cl. ................................................... 226/194
[58] Field of Search .............. 226/190, 194, 181, 178, 226/187

[56] References Cited

U.S. PATENT DOCUMENTS

| 3,602,415 | 8/1971 | Gross | 226/194 X |
| 3,754,696 | 8/1973 | Carolus | 226/194 X |
| 3,985,043 | 10/1976 | Toratani | 226/190 X |

*Primary Examiner*—Richard A. Schacher
*Attorney, Agent, or Firm*—James W. Gillman; Donald J. Lisa; Phillip H. Melamed

[57] ABSTRACT

A sub-assembly package which includes a bushing, a fly-wheel, and a capstan for use in a playback and/or recording apparatus. The fly-wheel is locked to one end of the capstan which is supported by the bushing, and the package is removably fixed to a supporting frame by a single nut.

9 Claims, 3 Drawing Figures

PACKAGE BUSHING-FLY WHEEL-CAPSTAN FOR PLAYBACK AND/OR RECORDING APPARATUS

It is already known that fly-wheels used in playback and/or recording apparatus are carried by the capstan for the purpose of being housed within the same playback and/or recording apparatus. At the same time, the flywheel must also carry the driving belt. As a consequence, the end of the capstan under the flywheel, must be supported by a thrust-bearing. This prevents free approach to the said flywheel, and requires disassembly of the parts to mount the driving belt on the flywheel. Furthermore, these capstans, particularly when they are small diameter and have the flywheel carried thereon in cantilever fashion, cannot accommodate the axial seal and grooved spring-rings normally associated with thrust bearings.

It is an object of the present invention to provide a sub-assembly package including a bushing, a flywheel, and a capstan, that overcomes the above-mentioned drawbacks and allows the sub-assembly to be mounted on a supporting frame in a manner such that a driving belt for the flywheel can be positioned in a flywheel groove without disassembling the parts from the supporting frame.

OF THE DRAWINGS

Figure 1:
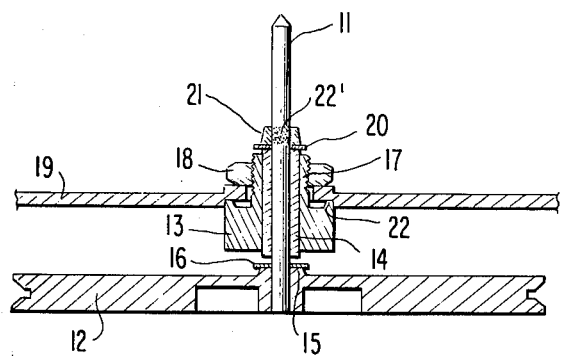
FIG. 1 is a cross-sectional illustration showing a preferred form of the sub-assembly package of the present invention.

With reference to FIG. 1, a shaft 11 forming the capstan of a playback and/or recording apparatus, is supported within a bushing 14. A flywheel 12 is keyed on the shaft 11 in any convenient way: radial locking, glueing, etc. The flywheel is provided with a shoulder adjacent the bushing 14, and a sliding washer 16 is positioned between the shoulder 15 and the bushing 14.

The bushing 14 is supported in an outer body 13 which is provided at its upper part with a threaded portion 17 on which a nut 18 is threaded. The bushing outer body 13 also has an upper ledge 22 formed with an antirotating key, which engages a frame or bearing element 19. Thus, when the nut 18 is tightened on the threaded portion 17, it produces a tightening of the bushing 14 and the bushing outer body 13 at the frame 19 and locks the sub-assembly package including shaft 11, flywheel 12, and bushing 13, 14 in situ.

A collar or sleeve 21 fits over the shaft 11 adjacent the bushing 13, 14 and is preferably glued, as at 22, but, in any case, is axially locked to the shaft 11 in a convenient way. A sliding washer 20 is positioned between bushing 14 and sleeve 21, and sleeve 21 and bushing 14 form a thrust-bearing for the shaft 11.

In the use of the sub-assembly package in a cassette playback and/or recording apparatus, the sleeve 21 is also tapered upward, as shown in the drawing, for the purpose of allowing its partial insertion into a corresponding seat formed in a cassette. Of course, the exterior diameter of sleeve 21 will be such to prevent creeping against the aforementioned seat when the cassette is placed for operation.

Equally obvious is the fact that the length of the sleeve 21 will be such as to prevent interference with the band and the (pressing) rolls of cassettes.

An important feature of the sub-assembly package, in accordance with the present invention, is that the nut 18 has an internal diameter greater than the external diameter of the washer 20 and sleeve 21 so that the nut 19 can pass freely over the capstan 11, the collar 21 and the washer 20, and then press the exterior body 13 of the bushing against the frame 19. It will be understood then that the subassembly package is easily mounted to the frame 19.

Furthermore, as is apparent from the drawings, the flywheel 12 is freely accessible from the opposite side of the frame 19, in such a way that a driving belt can be assembled and disassembled to the pulley 12 without the need for disassembly any other parts.

If, as is preferable, the collar or sleeve 21 is glued on the shaft 11, then, in the case of damage to any of the sub-assembly package parts, one can remove the nut 18 and replace the entire sub-assembly package comprising the bushing 13, 14, the collar 21, the fly-wheel 12 and the capstan 11. In this way it is possible to have easy attachment and/or repair of the sub-assembly package both in putting the unit together in manufacturing, and when the unit is serviced.

On the other hand, the sleeve or collar 21 can be locked in position to the capstan 11 with means that are different from the aforementioned glueing system.

Figure 3:
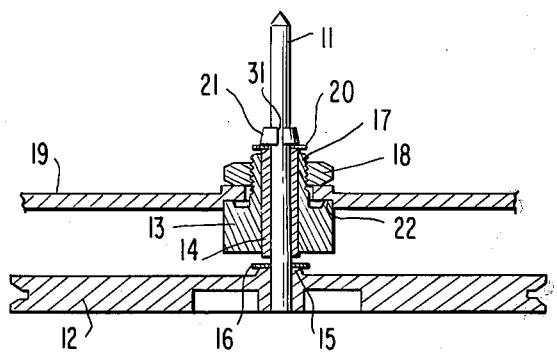
FIG. 3 is a view similar to FIGS. 1 and 2 showing a still further modified form of the invention.

For instance, as shown in FIG. 3, the collar 21 can be constructed from a wedge-shaped sleeve, split as shown at 31 along one side and sufficiently flexible to frictionally grip the capstan in locking relation.

Figure 2:
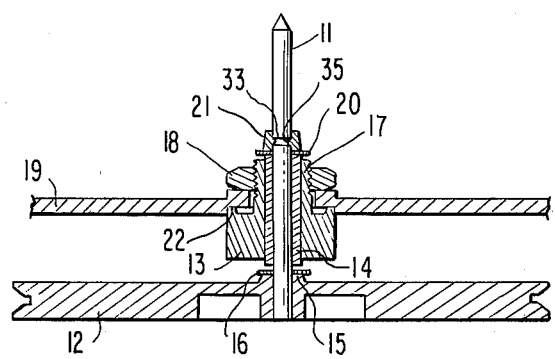
FIG. 2 is a view similar to FIG. 1 showing a modified form of the invention.

Another system for locking the sleeve or collar 21 on the capstan 11, shown in FIG. 2, can be obtained using one or more circumferential grooves 33 on the capstan, and forming the interior wall of the collar 21 with corresponding projections 35 to fit into these grooves. Furthermore, the sleeve or collar 21 could be formed as an integral part of the same capstan.

Summing up, the present invention discloses a sub-assembly package comprising a bushing, a flywheel, a capstan, and a thrust-bearing to be used in playback and/or recording apparatus, or in playback and/or recording apparatus for cassettes, which package can be installed and fastened to a supporting frame through tightening of only a single nut.

Therefore, the advantages of the present invention are evident ones, particularly the advantages of being capable of easy installation in place both on the assembly line, as well as when repair is needed. Thus, a damaged element can be removed and replaced with a new sub-assembly package already tested. This provides a beneficial cost reduction both in manufacture and in repair of a playback and/or recording apparatus.

I claim:

1. A sub-assembly package comprising a bushing, a flywheel, and a capstan for playback and/or recording apparatus said flywheel being locked to one end of the capstan, said bushing supporting said capstan, said flywheel provided with a shoulder adjacent said bushing, and a sliding washer between said bushing and said shoulder.

2. A sub-assembly package as defined in claim 1, said bushing including an exterior part having a length less than the length of the bushing and a diameter greater than the bushing and forming a support for the sub-assembly package, the remaining exterior part of said bushing having a threaded portion adapted to receive a locking nut.

3. A sub-assembly package as defined in claim 1, said capstan extending beyond said bushing and having a collar or sleeve fixed thereon and forming a thrust-bearing, and a sliding washer between said sleeve and said bushing.

4. A sub-assembly package as defined in claim 2, said nut having an interior diameter greater than the exterior diameter of said sleeve.

5. A sub-assembly package as defined in claim 3, said sleeve being tapered to fit into a seat provided in a cassette.

6. A sub-assembly package as defined in claim 3, said sleeve being axially locked on the capstan by glueing.

7. A sub-assembly package as defined in claim 3, said sleeve being axially locked on the capstan by a radially inward portion on the interior wall of the sleeve fitting into a circumferential groove provided on said capstan.

8. A sub-assembly package as defined in claim 3, said sleeve being split lengthwise and frictionally gripping said capstan.

9. A sub-assembly package as defined in claim 3, said nut having an interior diameter greater than the exterior diameter of said sleeve and said second mentioned sliding washer.

* * * * *